United States Patent
Fukuchi

(10) Patent No.: US 9,774,194 B2
(45) Date of Patent: Sep. 26, 2017

(54) CHARGE AND DISCHARGE CONTROL CIRCUIT AND BATTERY DEVICE

(71) Applicant: Seiko Instruments Inc., Chiba-shi, Chiba (JP)

(72) Inventor: Shinya Fukuchi, Chiba (JP)

(73) Assignee: SII Semiconductor Corporation (JP)

( * ) Notice: Subject to any disclaimer, the term of this patent is extended or adjusted under 35 U.S.C. 154(b) by 99 days.

(21) Appl. No.: 14/793,059

(22) Filed: Jul. 7, 2015

(65) Prior Publication Data
US 2016/0013668 A1    Jan. 14, 2016

(30) Foreign Application Priority Data
Jul. 9, 2014    (JP) .................................. 2014-141639

(51) Int. Cl.
*H02J 7/00*    (2006.01)

(52) U.S. Cl.
CPC .......... *H02J 7/0021* (2013.01); *H02J 7/0026* (2013.01); *H02J 7/0072* (2013.01)

(58) Field of Classification Search
CPC .................................................... H02J 7/0021
USPC ......................................................... 320/134
See application file for complete search history.

(56) References Cited

U.S. PATENT DOCUMENTS

| | | | | |
|---|---|---|---|---|
| 6,239,581 | B1 * | 5/2001 | Yoshida | G01R 19/16542 320/162 |
| 6,373,225 | B1 * | 4/2002 | Haraguchi | H02J 7/0016 320/122 |
| 6,437,541 | B1 | 8/2002 | Sakurai | |
| 6,762,588 | B2 * | 7/2004 | Miyazaki | H02J 7/0026 320/116 |
| 8,471,526 | B2 * | 6/2013 | Kanno | H01M 10/482 320/116 |
| 8,878,541 | B2 * | 11/2014 | Nishizawa | G01R 31/362 320/116 |
| 8,907,626 | B2 * | 12/2014 | Tanigawa | B60L 11/1851 320/116 |
| 2011/0059337 | A1 * | 3/2011 | Yoshida | H01M 10/48 429/7 |

FOREIGN PATENT DOCUMENTS

JP    2002-204532 A    7/2002

* cited by examiner

*Primary Examiner* — Drew A Dunn
*Assistant Examiner* — Jerry D Robbins
(74) *Attorney, Agent, or Firm* — Brinks Gilson & Lione

(57) ABSTRACT

Provided are a charge and discharge control circuit having a small circuit area and a compact battery device. A constant current circuit and an external resistor are connected to a voltage monitoring terminal so that a terminal voltage is pulled up or pulled down based on an external input. Moreover, output logic of a comparator and overcharge detection and overdischarge detection are switched based on the external input.

4 Claims, 3 Drawing Sheets

CHARGE AND DISCHARGE CONTROL CIRCUIT AND BATTERY DEVICE

RELATED APPLICATIONS

This application claims priority under 35 U.S.C. §119 to Japanese Patent Application No. 2014-141639 filed on Jul. 9, 2014, the entire content of which is hereby incorporated by reference.

BACKGROUND OF THE INVENTION

1. Field of the Invention

The present invention relates to a charge and discharge control circuit configured to detect a voltage and an abnormality of a secondary battery, and to a battery device. More particularly, the present invention relates to a circuit configured to detect overcharge and overdischarge.

2. Description of the Related Art

A battery device is mainly used as a power supply for driving a portable electronic device (load). The battery device has an overcharge protection function of protecting a secondary battery from overcharge when a voltage of the battery to be connected to a load is increased due to charging to exceed an overcharge detection voltage (hereinafter referred to as VCU). Moreover, the battery device has an overdischarge protection function of protecting the secondary battery from overdischarge when the voltage of the battery is reduced due to discharging to fall below an overdischarge detection voltage (hereinafter referred to as VDL) (for example, see Japanese Patent Application Laid-open No. 2002-204532).

FIG. 3 is a circuit diagram for illustrating a related-art battery device. The related-art battery device includes secondary batteries 10 and 11 connected in series, a charge and discharge control circuit 100, a charge control FET 21, a discharge control FET 22, and load connection terminals 23 and 24. The charge and discharge control circuit 100 includes a control circuit 110, output circuits 111 and 112, comparators 113, 114, 115, and 116, reference voltage circuits 117 and 118, and resistor circuits 120, 121, 122, 123, 124, 125, 126, and 127. The comparators 113 and 114 detect overcharge. The comparators 115 and 116 detect overdischarge.

The related-art battery device operates as described below to control charge and discharge of the secondary battery.

A charge control FET gate connection terminal 104 outputs High to turn on the charge control FET 21 when a voltage of the secondary battery 10, namely, a voltage between voltage monitoring terminals 101 and 102 is less than VCU. Thus, the secondary batteries 10 and 11 are allowed to be charged. The charge control FET gate connection terminal 104 outputs Low to turn off the charge control FET 21 when the voltage between the voltage monitoring terminals 101 and 102 is equal to or more than VCU. Thus, the secondary batteries 10 and 11 are inhibited from being charged and are protected from the overcharge. A voltage of the secondary battery 11, namely, a voltage between voltage monitoring terminals 102 and 103 is similarly detected and controlled.

A discharge control FET gate connection terminal 105 outputs High to turn on the discharge control FET 22 when the voltage of the secondary battery 10, namely, the voltage between the voltage monitoring terminals 101 and 102 is more than VDL. Thus, the secondary batteries 10 and 11 are allowed to be discharged so that a load connected between the load connection terminals 23 and 24 can be driven. The discharge control FET gate connection terminal 105 outputs Low to turn off the discharge control FET 22 when the voltage of the secondary battery 10, namely, the voltage between the voltage monitoring terminals 101 and 102 is equal to or less than VDL. Thus, the secondary batteries 10 and 11 are inhibited from being discharged and are protected from the overdischarge. The voltage of the secondary battery 11, namely, the voltage between the voltage monitoring terminals 102 and 103 is similarly detected and controlled.

However, the above-mentioned charge and discharge control circuit has a problem in that, when a cell is added, a reference voltage circuit, a comparator and resistor circuit for detecting overcharge, and a comparator and resistor circuit for detecting overdischarge are added, and hence an area of the circuit is increased as the number of cells is increased.

SUMMARY OF THE INVENTION

The present invention has been conceived in order to solve the problem as described above, and provides a charge and discharge control circuit having a small circuit area and a compact battery device.

In order to solve the related-art problem, a battery device according to one embodiment of the present invention has the following configuration.

The battery device includes as many comparators and resistor circuits as cells, a constant current circuit operated based on an external input, and a resistor for pulling up or pulling down a voltage monitoring terminal.

According to the battery device of the one embodiment of the present invention, the numbers of the comparators and resistor circuits per cell may be reduced, and hence the circuit area may be reduced. Thus, it is possible to provide the charge and discharge control circuit having the small circuit area and the compact battery device.

DETAILED DESCRIPTION OF THE PREFERRED EMBODIMENTS

Now, a battery device including a charge and discharge control circuit according to an embodiment of the present invention is described with reference to the drawings.

Figure 1:
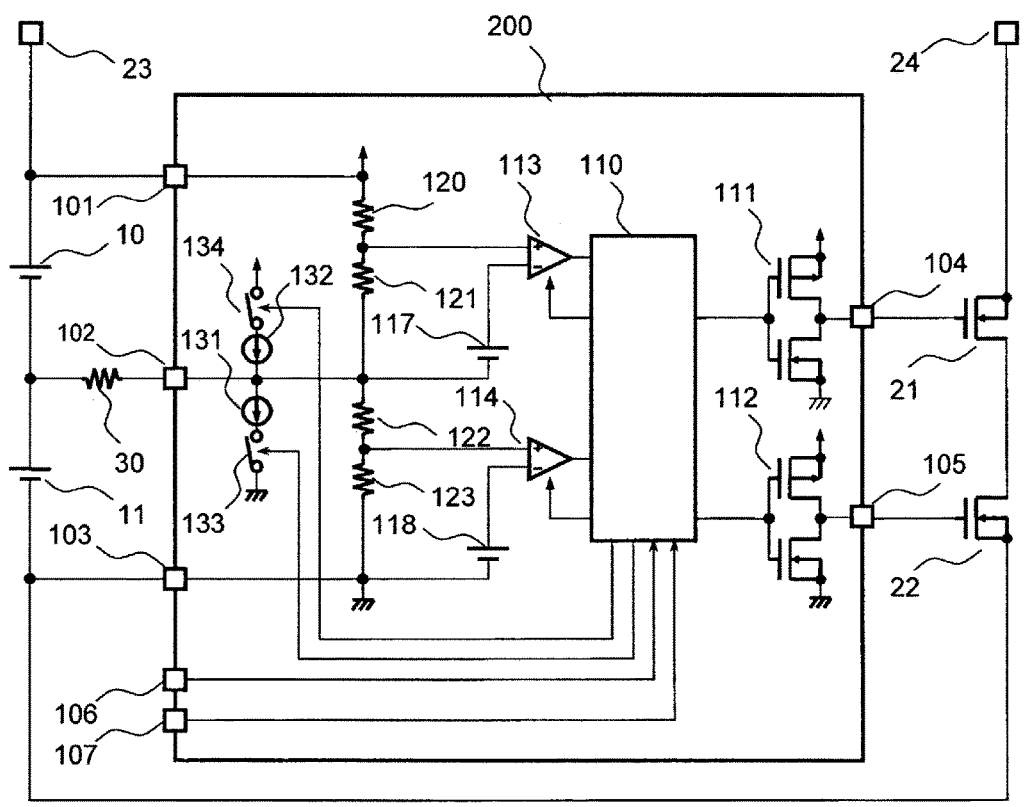
FIG. 1 is a block diagram of a battery device including a charge and discharge control circuit according to an embodiment of the present invention.
Figure 2:
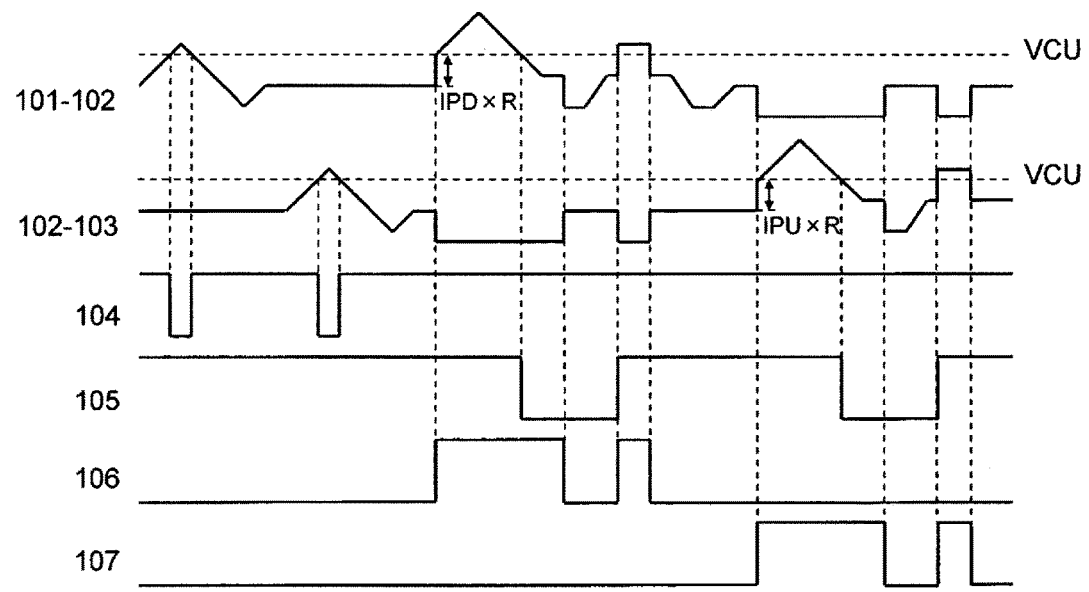
FIG. 2 is a timing chart of the battery device including the charge and discharge control circuit of this embodiment.
Figure 3:
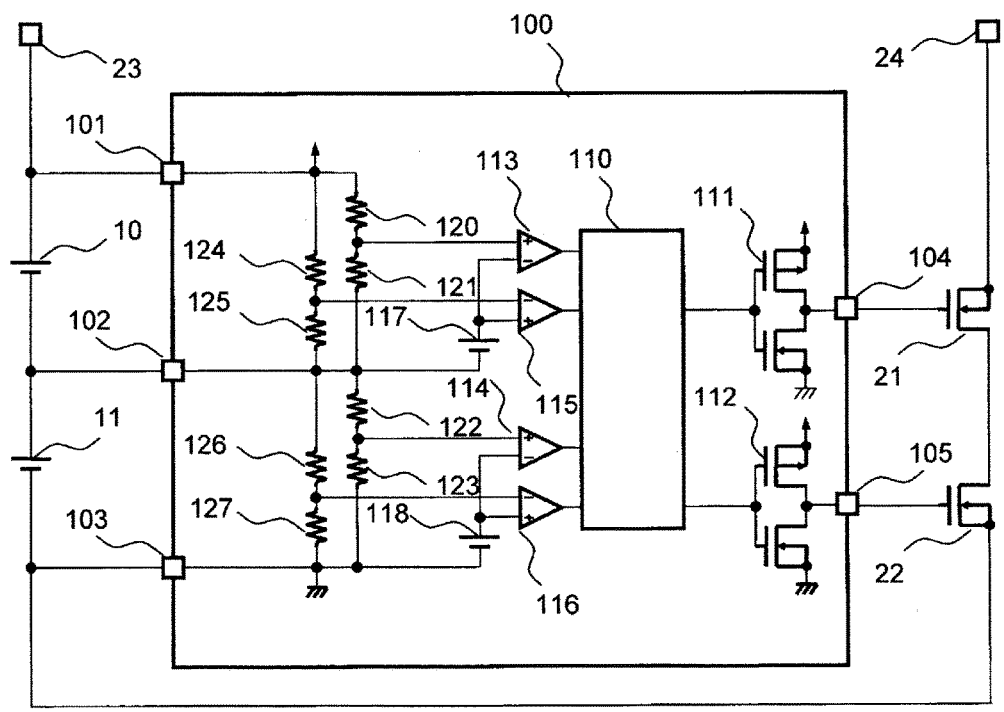
FIG. 3 is a block diagram of a related-art battery device including a charge and discharge control circuit.

FIG. 1 is a block diagram of the battery device including the charge and discharge control circuit of this embodiment.

The battery device of this embodiment includes secondary batteries 10 and 11 connected in series, a charge and discharge control circuit 200, a charge control FET 21, a discharge control FET 22, an external resistor 30, and load connection terminals 23 and 24. The charge and discharge control circuit 200 includes a control circuit 110, output circuits 111 and 112, comparators 113 and 114, reference voltage circuits 117 and 118, resistor circuits 120, 121, 122, and 123, constant current circuits 131 and 132, and switches 133 and 134. Further, the charge and discharge control circuit 200 has voltage monitoring terminals 101, 102, and 103, a charge control FET gate connection terminal 104, a discharge control FET gate connection terminal 105, and input terminals 106 and 107. The voltage monitoring terminal 101 also serves as a first power supply terminal, and the voltage monitoring terminal 103 also serves as a second power supply terminal.

The secondary battery 10 has a positive electrode terminal connected to the load connection terminal 23 and the voltage monitoring terminal 101, and a negative electrode terminal connected to one end of the external resistor 30 and a positive electrode terminal of the secondary battery 11. The secondary battery 11 has a negative electrode terminal connected to a source of the discharge control FET 22 and the voltage monitoring terminal 103. The external resistor 30 has the other end connected to the voltage monitoring terminal 102. A gate of the charge control FET 21 is connected to the charge control FET gate connection terminal 104, and a gate of the discharge control FET 22 is connected to the discharge control FET gate connection terminal 105. The charge control FET 21 has a drain connected to a drain of the discharge control FET 22, and a source connected to the load connection terminal 24.

The resistors 120 and 121 are connected in series between the voltage monitoring terminals 101 and 102. The resistors 122 and 123 are connected in series between the voltage monitoring terminals 102 and 103. The switch 134 and the constant current circuit 132 are connected in series between the first power supply terminal and the voltage monitoring terminal 102. The switch 133 and the constant current circuit 131 are connected in series between the voltage monitoring terminal 102 and the second power supply terminal. The comparator 113 has an inverting input terminal connected to the voltage monitoring terminal 102 through the reference voltage circuit 117, and a non-inverting input terminal connected to a node of the resistors 120 and 121. The comparator 114 has an inverting input terminal connected to the voltage monitoring terminal 103 through the reference voltage circuit 118, and a non-inverting input terminal connected to a node of the resistors 122 and 123. The control circuit 110 has input terminals connected to output terminals of the comparator 113 and the comparator 114 and the input terminals 106 and 107, output terminals connected to input terminals of the output circuits 111 and 112, and control terminals connected to the comparators 113 and 114 and the switches 133 and 134.

Next, operation of the battery device including the charge and discharge control circuit of this embodiment is described.

For example, when a control signal of Low is input to each of the input terminals 106 and 107, the charge and discharge control circuit 200 monitors overcharge of the secondary batteries 10 and 11, to thereby protect the batteries from the overcharge when the voltage of the battery exceeds an overcharge detection voltage (hereinafter referred to as VCU). Moreover, for example, when a control signal of High is input to the input terminal 106 and the control signal of Low is input to the input terminal 107, the charge and discharge control circuit 200 monitors overdischarge of the secondary battery 10, to thereby protect the battery from the overdischarge when the voltage of the battery falls below an overdischarge detection voltage (hereinafter referred to as VDL). Specifically, the control circuit 110 controls operations of the comparators 113 and 114 and the switches 133 and 134 in response to the control signals input to the input terminals 106 and 107, and monitors the overcharge and the overdischarge in a switching manner.

[When Overcharge of Secondary Battery Is Monitored]

The control circuit 110 controls the switches 133 and 134 to be opened when the control signal of Low is input to each of the input terminals 106 and 107. The comparator 113 compares a voltage obtained by dividing a voltage between the voltage monitoring terminals 101 and 102 by the resistors 120 and 121, and a reference voltage of the reference voltage circuit 117. The comparator 114 compares a voltage obtained by dividing a voltage between the voltage monitoring terminals 102 and 103 by the resistors 122 and 123, and a reference voltage of the reference voltage circuit 118.

Output logic of the comparator 113 and the comparator 114 is set to positive logic based on the control signal from the control circuit 110. The comparator 113 and the comparator 114 each output the signal of High when a voltage of the non-inverting input terminal becomes equal to or more than a voltage of the inverting input terminal, that is, when the voltage of the secondary battery becomes equal to or more than VCU.

When the signal of High is input from the comparator 113 or the comparator 114, the control circuit 110 determines that the secondary battery is in an overcharged state. Then, the control circuit 110 outputs the signal of High to the output circuit 111 so that the signal of Low is output from the charge control FET gate connection terminal 104 to turn off the charge control FET 21, which inhibits the secondary batteries 10 and 11 from being charged.

When the signal of Low is input from each of the comparator 113 and the comparator 114, the control circuit 110 determines that the secondary battery is not in the overcharged state. Then, the control circuit 110 outputs the signal of Low to the output circuit 111 so that the signal of High is output from the charge control FET gate connection terminal 104 to turn on the charge control FET 21, which allows the secondary batteries 10 and 11 to be charged.

[When Overdischarge of Secondary Battery Is Monitored]

In the charge and discharge control circuit 200, when the control signal of High is input to the input terminal 106 and the control signal of Low is input to the input terminal 107, the overdischarge of the secondary battery 10 is monitored. When the control signal of Low is input to the input terminal 106 and the control signal of High is input to the input terminal 107, the overdischarge of the secondary battery 11 is monitored.

When the control signal of High is input to the input terminal 106 and the control signal of Low is input to the input terminal 107, the control circuit 110 controls the switch 133 to be short-circuited and the switch 134 to be opened. That is, the voltage monitoring terminal 102 is pulled down by the constant current circuit 131, and a constant current is caused to flow from the secondary battery 11 through the external resistor 30.

When a value of the current caused to flow by the constant current circuit 131 is represented by IPD and a resistance value of the external resistor 30 is represented by R, the voltage between the voltage monitoring terminals 101 and 102 has a value obtained by adding a voltage of IPD×R to the voltage of the secondary battery 10. Thus, the comparator 113 compares the voltage obtained by dividing the voltage between the voltage monitoring terminals 101 and 102 by the resistors 120 and 121, and the reference voltage of the reference voltage circuit 117, to thereby detect a voltage of VDL=VCU−IPD×R.

The output logic of the comparator 113 is set to negative logic based on the control signal from the control circuit 110. The comparator 113 outputs the signal of High when the voltage of the non-inverting input terminal becomes less than the voltage of the inverting input terminal, that is, when the voltage of the secondary battery 10 becomes less than VDL.

When the signal of High is input from the comparator 113, the control circuit 110 determines that the secondary battery 10 is in an overdischarged state. Then, the control circuit 110 outputs the signal of High to the output circuit 112 so that the signal of Low is output from the discharge control FET gate connection terminal 105 to turn off the discharge control FET 22, which inhibits the secondary batteries 10 and 11 from being discharged.

When the control signal of Low is input to the input terminal 106 and the control signal of High is input to the input terminal 107, the control circuit 110 controls the switch 133 to be opened and the switch 134 to be short-circuited. That is, the voltage monitoring terminal 102 is pulled up by the constant current circuit 132, and a constant current is caused to flow to the secondary battery 10 through the external resistor 30.

Thus, the comparator 114 compares the voltage obtained by dividing the voltage between the voltage monitoring terminals 102 and 103 by the resistors 122 and 123, and the reference voltage of the reference voltage circuit 118, to thereby detect a voltage of VDL=VCU−IPD×R.

The charge and discharge control circuit 200 monitors the overdischarge of the secondary battery 11, to thereby protect the battery from the overdischarge when the voltage of the battery falls below VDL. When the value of the current caused to flow the constant current circuit 132 is represented by IPU, VDL is expressed as VCU−IPU×R.

The output logic of the comparator 114 is set to negative logic based on the control signal from the control circuit 110. The comparator 114 outputs the signal of High when the voltage of the non-inverting input terminal becomes less than the voltage of the inverting input terminal, that is, when the voltage of the secondary battery 11 becomes less than VDL.

When the signal of High is input from the comparator 113, the control circuit 110 determines that the secondary battery 11 is in an overdischarged state. Then, the control circuit 110 outputs the signal of High to the output circuit 112 so that the signal of Low is output from the discharge control FET gate connection terminal 105 to turn off the discharge control FET 22, which inhibits the secondary batteries 10 and 11 from being discharged.

Further, when the signal of Low is input from each of the comparator 113 and the comparator 114, the control circuit 110 determines that the secondary battery 10 and the secondary battery 11 are not in the overdischarged state. Then, the control circuit 110 outputs the signal of Low to the output circuit 112 so that the signal of High is output from the discharge control FET gate connection terminal 105 to turn on the discharge control FET 22, which allows the secondary batteries 10 and 11 to be discharged.

The overdischarge of the secondary battery is monitored in time division by inputting the control signal of Low or High to each of the input terminal 106 and the input terminal 107 in a switched manner. Then, after the overdischarge is detected, even if Low is input to both of the input terminals 106 and 107, the detection state is not changed, that is, an output signal to the output circuit 112 is maintained.

As described above, according to the battery device including the charge and discharge control circuit of this embodiment, in order to detect the overcharge and the overdischarge, only one pair of voltage detection circuits each including a comparator and a resistor circuit is required per secondary battery to which the overcharge and overdischarge detection is to be performed, and hence the circuit area can be reduced.

Note that, the battery device of this embodiment is described by the example that includes the two secondary batteries 10 and 11 and the charge and discharge control circuit including the voltage monitoring terminals 101, 102, and 103 for monitoring the voltages of those batteries. However, the number of secondary batteries is not limited to two and only required to be more than one.

Moreover, in this embodiment, the battery device includes the input terminals 106 and 107 to which the control signals are input, but the logic of the signal and the configuration are not limited thereto. For example, the charge and discharge control circuit may have the function of inputting the control signals.

Moreover, the output logic of the comparators 113 and 114 is switched by the control circuit 110 based on the control signal, but the present invention is not limited thereto. For example, the control circuit 110 may switch the output logic of the comparators 113 and 114 to make the determination.

Moreover, the battery device includes the external resistor 30, but the voltage monitoring terminal 102 may include a resistor instead.

What is claimed is:

1. A charge and discharge control circuit, comprising:
   a first voltage monitoring terminal, a second voltage monitoring terminal, and a third voltage monitoring terminal,
      the first voltage monitoring terminal and the second voltage monitoring terminal being connectable to a first secondary battery,
      the second voltage monitoring terminal and the third voltage monitoring terminal being connectable to a second secondary battery;
   a first resistor circuit connected between the first voltage monitoring terminal and the second voltage monitoring terminal;
   a second resistor circuit connected between the second voltage monitoring terminal and the third voltage monitoring terminal;
   a first reference voltage circuit connected to the second voltage monitoring terminal;
   a second reference voltage circuit connected to the third voltage monitoring terminal;
   a first comparator including:
      a first input terminal connected to an output terminal of the first resistor circuit; and
      a second input terminal connected to an output terminal of the first reference voltage circuit;
   a second comparator including:
      a first input terminal connected to an output terminal of the second resistor circuit; and
      a second input terminal connected to an output terminal of the second reference voltage circuit;
   a control circuit including:
      a first input terminal connected to an output terminal of the first comparator; and
      a second input terminal connected to an output terminal of the second comparator,
      the control circuit being configured to monitor a state of each of the first secondary battery and the second secondary battery based on a signal input to each of the first input terminal and the second input terminal;
   a first constant current circuit connected between the first voltage monitoring terminal and the second voltage monitoring terminal, the first constant current circuit being controlled to be turned on and off based on a first control signal of the control circuit;
a second constant current circuit connected between the second voltage monitoring terminal and the third voltage monitoring terminal, the second constant current circuit being controlled to be turned on and off based on a second control signal of the control circuit; and
a resistor connected between a node of the first secondary battery and the second secondary battery and a node of the first constant current circuit and the second constant current circuit,
the control circuit being further configured to:
monitor overcharge of the first secondary battery and overcharge of the second secondary battery by turning off the first constant current circuit and the second constant current circuit;
monitor overdischarge of the first secondary battery by turning on the second constant current circuit; and
monitor overdischarge of the second secondary battery by turning on the first constant current circuit.

2. A charge and discharge control circuit according to claim 1, wherein output logic of the first comparator and output logic of the second comparator are each switched based on a control signal of the control circuit.

3. A battery device, comprising:
the charge and discharge control circuit of claim 1;
a first secondary battery connected between the first voltage monitoring terminal and the second voltage monitoring terminal; and
a second secondary battery connected between the second voltage monitoring terminal and the third voltage monitoring terminal.

4. A battery device, comprising:
the charge and discharge control circuit of claim 2;
a first secondary battery connected between the first voltage monitoring terminal and the second voltage monitoring terminal; and
a second secondary battery connected between the second voltage monitoring terminal and the third voltage monitoring terminal.

* * * * *